United States Patent [19]
Christou et al.

[11] 4,031,359
[45] June 21, 1977

[54] STRAIGHT LINE READ SYSTEM

[75] Inventors: Kyriakos Christou, Livonia; Karlis Kruklitis, Plymouth; William R. Burger, Livonia, all of Mich.

[73] Assignee: Burroughs Corporation, Detroit, Mich.

[22] Filed: Dec. 18, 1975

[21] Appl. No.: 642,061

[52] U.S. Cl. .............................. 235/61.11 D; 360/2
[51] Int. Cl.² ................. G06K 13/07; G11B 25/04
[58] Field of Search ............ 235/61.11 D, 61.11 R; 360/2, 90; 340/146.3 R

[56] References Cited
UNITED STATES PATENTS

| | | |
|---|---|---|
| 3,752,962 | 8/1973 | Greskovics ................. 235/61.11 D |
| 3,801,804 | 4/1974 | Von Glahn et al. ........ 235/61.11 D |
| 3,831,188 | 8/1974 | Zupanic ..................... 235/61.11 D |
| 3,898,687 | 8/1975 | Schmidt ..................... 235/61.11 D |
| 3,947,663 | 3/1976 | DeSandre et al. .......... 235/61.11 D |

*Primary Examiner*—Daryl W. Cook
*Attorney, Agent, or Firm*—Carl Fissell, Jr.; Ronald L. Taylor; Kevin R. Peterson

[57] ABSTRACT

A system for accurately controlling the position of documents as they are throughputted along a straight line path for purposes of MICR writing and reading thereon. Accurate control of document position along a linear path is obtained by minimizing speed variations of a throughputted document, by maintaining a throughputted document in good registration, and by holding closely proximate the throughputted document to the read or write head.

42 Claims, 5 Drawing Figures

STRAIGHT LINE READ SYSTEM

CROSS REFERENCE TO RELATED PATENTS

A patent application entitled "Method And Apparatus For Identifying Characters Printed On A Document Which Cannot Be Machine Read" bearing Application Ser. No. 573,787 and filed on May 1, 1975 by William B. Templeton and assigned to Burroughs Corporation describes and claims a document handling system upon which the present invention is a component of.

BACKGROUND OF THE INVENTION

1. Field of the Invention

The invention relates generally to systems for handling documents to be read and more particularly to apparatuses for controlling the positioning of documents being MICR write and read in the document handling system.

2. Prior Art

In previous document handling mechanisms having to do with MICR writing and reading on documents, a flat belt would wrap externally around a 90° are of a single drum of the same height thus allowing documents to flow curvilinearly therebetween. The write or read MICR heads would be located underneath the drum with the pole tips of the head coinciding with the circumference of the drum. Nonvariable or constant speed of the document would be approximated by means of a synchronous motor driving the drum and also by means of a relatively large amount of inertia association with the drum. Document registration, that is limiting of skewing and vertical translation, would be attempted to be maintained through the restraining action of the belt. Close proximity of the document to each of the heads would be sought through use of a simple flexure which would press the document against the heads.

The major disadvantages of the supra described system include the need for a relatively expensive curvilinear path for document reading thus necessitating a relatively awkward L-shaped external system configuration. Since very high pressures are required to position a document in a curvilinear path, this could result in such problems as uneven speed control, poor registration, and loose document to head positioning occurring through time due to premature and uneven wearing out of overstressed components in the system.

SUMMARY OF THE INVENTION

It is an object of the invention to provide an inexpensive linear defined path for throughputting documents while they are being MICR written or read thereon thus enabling the external configuration of any system containing the linear defined path to be likewise linear.

It is a further object of the invention to provide a constant speed for throughputting documents in the linear defined path.

It is another object of the invention to provide controlled registration of the throughputted documents in the linear defined path for limiting skewing and vertical translation thereof.

It is yet another object of the invention to provide holding of the document closely proximate to either the write or the read head in the linear defined path for positive communication therebetween.

In carrying out the objects of the invention in a document handling apparatus, a serial stream of documents is inputted into a linear path defining a guideway to be throughputted therethrough. The documents are driven in the guideway at a constant speed by a pair of drums, maintained in good registration by a pressure flexure disposed into the guideway and held in close proximity to either the write or read MICR heads by a cantilever flexure.

BRIEF DESCRIPTION OF THE DRAWINGS

Various other objects, advantages and meritorious features of the invention will become more fully apparent from the following specification, appended claims and accompanying drawing sheets.

The features of a specific embodiment of the invention are illustrated in the drawings, in which.

GENERAL DESCRIPTION OF THE INVENTIVE SYSTEM

Figure 1:
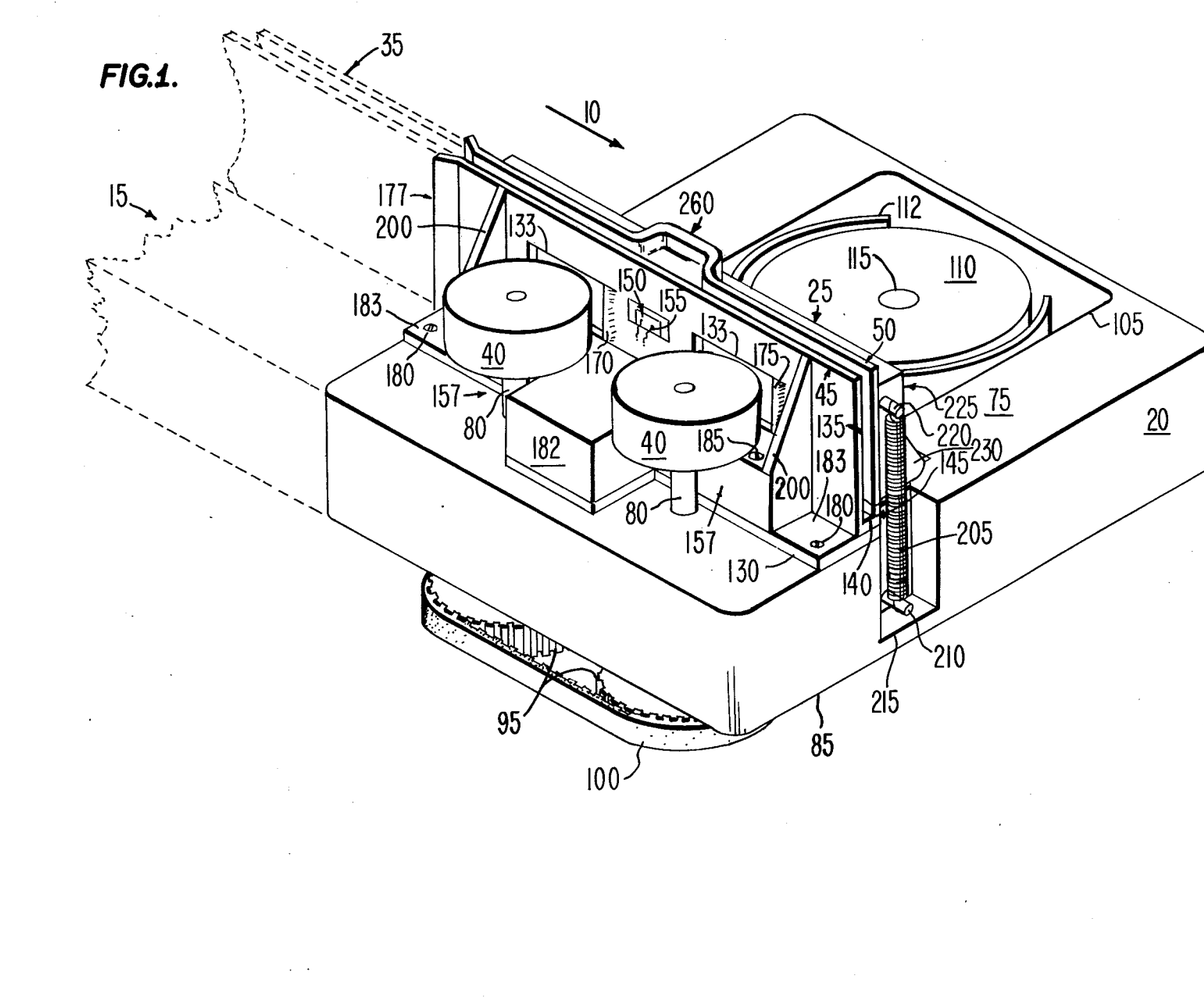
FIG. 1 is a perspective view of the straight line read system.

The inventive straight line read system or transport 5 is shown in the drawings comprising FIGS. 1 through 5 wherein the component parts are identified by like reference numerals. As shown in FIG. 1, the system 5 when secured on a host document handling apparatus 15 by screws or other means (not shown), will be disposed to be in line with the apparatus 15 document flow 10. The system 5 comprises a relatively squared off and planar modular base member 20 composed of a plastic-like material upon which the remainder of the system 5 may be supported.

Figure 2:
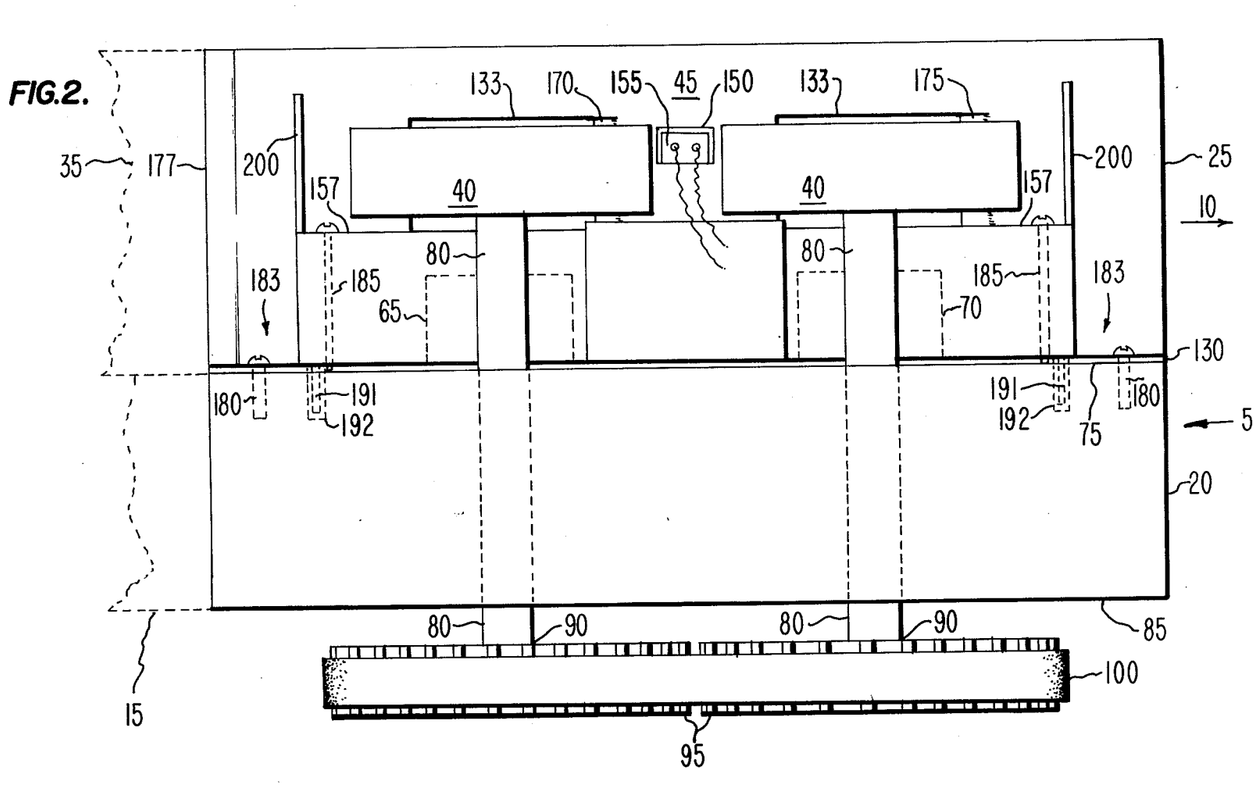
FIG. 2 is a front view of the straight line read system of FIG. 1.
Figure 3:
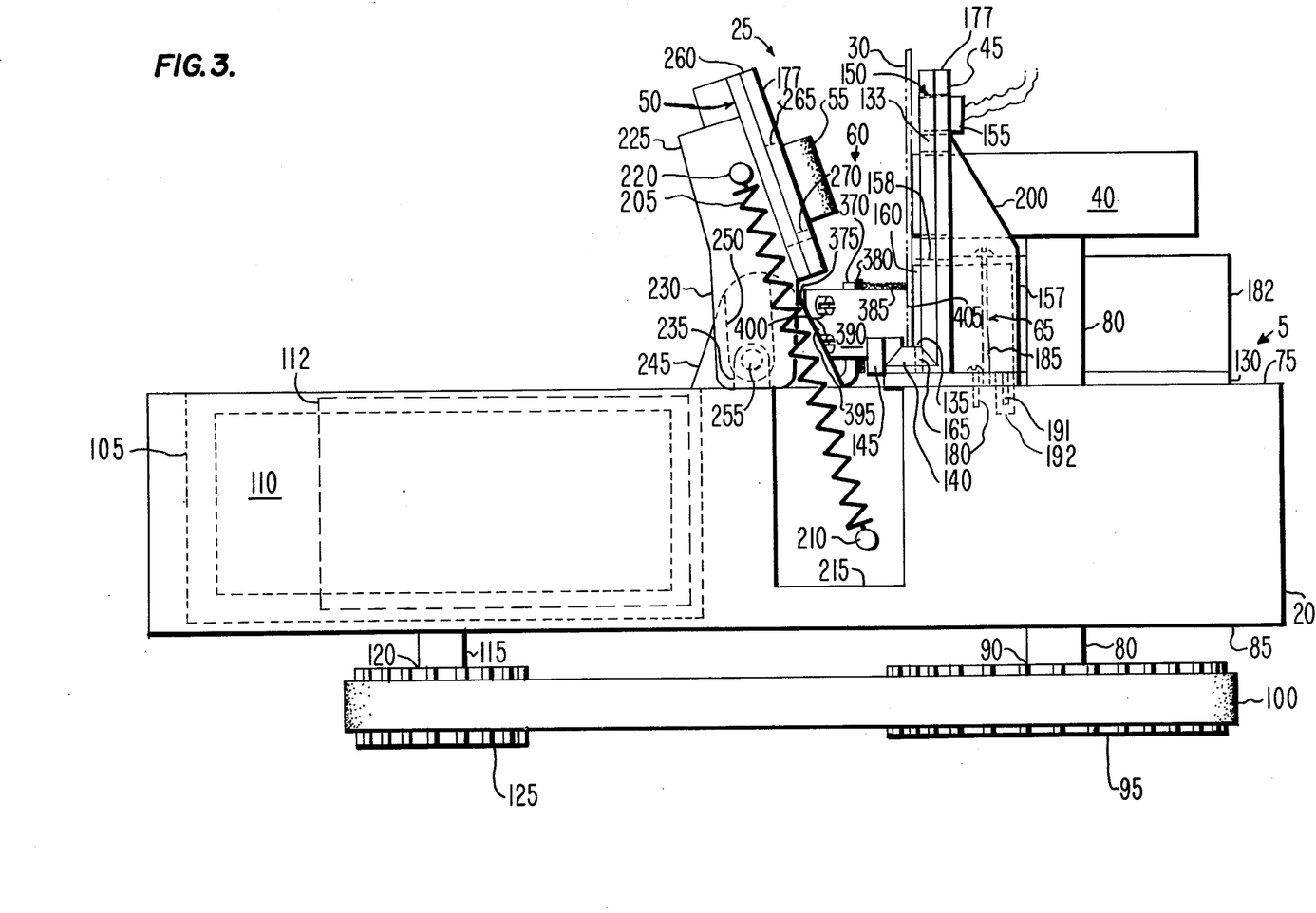
FIG. 3 is a side view of the straight line read system of FIG. 1 in its non-operating open condition.
Figure 4:
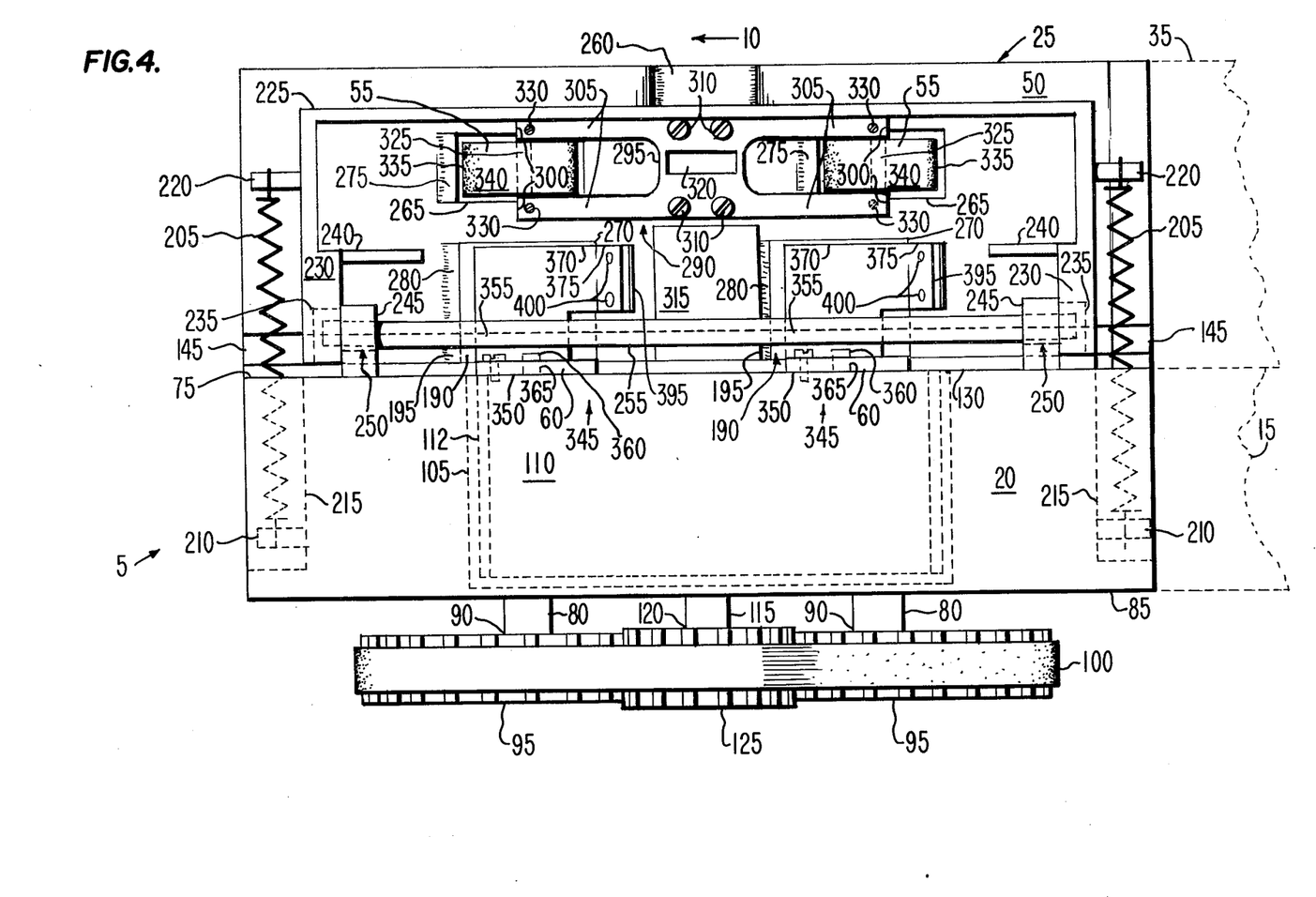
FIG. 4 is a back view of the straight line read system of FIG. 1.
Figure 5:
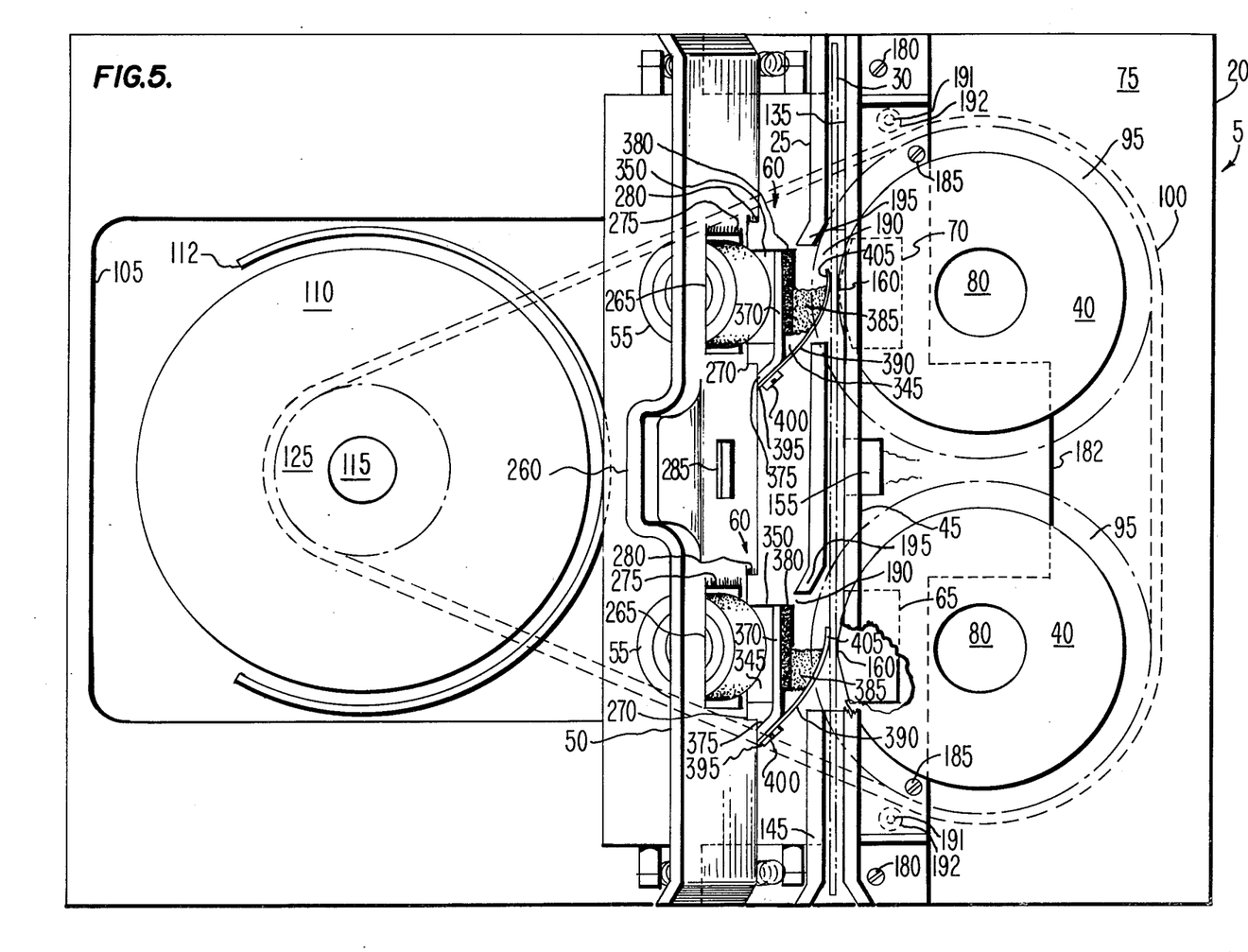
FIG. 5 is a top view of the straight line read system of FIG. 1 in its non-operating open condition.

Disposed on the base member 20, as shown in FIGS. 1 and 2, is a guideway 25 also composed of a plastic-like material for defining a linear path for the document 30 flowing through the system 5. The system guideway 25 may be aligned to straight line interceptibly input from and output documents to the apparatus guideway 25 since both the appartus 35 and system guideways 25 are linear as to themselves and colinear as to each other. The system 5 further comprises a pair of high inertia drums 40, as shown in FIGS. 1 and 2, disposed on a first side 45 of the system guideway 25 to tangentially drive the documents 30 in the system guideway 25 at a constant speed as will be seen infra. On the second side 50 of the system guideway 25 is disposed a spring-loaded pair of pressure rollers 55, as shown in FIGS. 1, 3 and 4, that operatively contact the documents 30 in the system guideway 25 to provide good registration for spatial positioning therefore that will be constant relative to the drive drums 40 through time. Additionally disposed on the second side 50 of the system guideway 25 is a pair of document-to-head pressure devices 60, as shown in FIGS. 1, 4 and 5, for maintaining the document 30 in the system guideway 25 closely proximate to the respective read 70 or write heads 65 in the system 5 for good communicative interface with the zones of reading and writing. The heads of stations 65, 70 may be of the magnetic ink character recognition (MICR) type, but the invention need not be necessarily limited thereto.

More particularly, the pair of drive drums 40, as shown in FIGS. 1 and 2, are composed of non-magnetic or low permeability material such as aluminum so as not to inductively pick up stray magnetic fields from emulating sources, as will be discussed infra, that might in turn be interferably picked up by the heads 65, 70. To eliminate any static potential that may be generated or picked up by the drive drums 40 and thus adversely interfere with the heads 65, 70 operation, an operative ground may be put to the drive drums 40 (not shown) to eliminate any such problems. The drive drums 40, themselves, are disposed to rotate in a plane relatively parallel to the top side 75 of the base member 20 as shown in FIG. 5. Each of the drive drums 40 may have a shaft 80 of low permeability metallic material such as aluminum axially disposed to depend from its respective drum 40 to freely dependably traverse down through the base member 20 to extend out from the bottom side 80 as shown in FIG. 3. On each of the lower ends 90 of the shafts 80 will be axially disposed a spur-like gear or timing pulley 95, as shown in FIGS. 2 and 3, that may be composed of a heavily weighted material such as steel to give it high inertia. A power transmission means such as a grooved timing belt 100 of rubber-like material will operatively connect the pair of spur-like gears 95 thereby regulating the speed of each spur-like gear 95 as to each other. On the top surface 75 of the second side 50 of the base member 25 is disposed a well-like indentation 105 in the base member 25 in which sits a motor 110 preferably of the AC synchronous type which is relatively very stable as to speed. Since the motor 110 is a magnetic field emulator source, a magnetic shield 112 of a highly magnetic, namely, high permeability material such as nickel-iron alloy, wrought iron or alike may be erected to partially wrap the external circumference of the motor 110 on a side facing the system guideway 25 and the heads 65, 70, thereby inductively deflecting the magnetic field and thus protect the heads 65, 70. The drive shaft 115 of the motor 110 is disposed to axially depend therefrom into the well-like indentation 105 to freely traverse therethrough and out from the bottom side 85 of the base member 20. Disposed on the bottom end 120 of the motor drive shaft 115 is a spur-like gear 125 having high inertia like the spur-like gears 95 and which is in operative driving connection with the supra timing belt 100. The combination of the stable motor 110, regulating timing belt 100 and high inertia gears 95, 125 act together to maintain the documents 30 throughputtably traveling through the system guideway 25 at a relatively very constant speed thus facilitating reading and writing by the heads 65, 70.

The system guideway 25, as shown in FIGS. 1 and 3, as indicated supra, has a first and a second side or guidewall 50. The first side 45 is fixed relative to the base member 20 while the second side 50 is operative to pivotally swing out for easy access when tactilely manipulated. The first side 45 is disposed to sit on a plate 130 having low permeability such as aluminum for minimal magnetic interference with the heads 65, 70. The plate 130, when secured, will act as a relatively rigid planar buffer to minimize relatively slight vertical spatial anomalies on the top surface 75 of the base member 20 that might otherwise disturb document 30 flow. A pair of apertures 133, as shown in FIG. 2, have been made in the first side 45 to facilitate the drive drums 40 to be disposed to traverse therethrough the first side 45 and slightly into the document channel 135 itself. The first side 45 is further disposed to form a bottom track 140 in the channel 135 with a lip 145 extending slightly up from the bottom 140 on the same side as the second side 50 to enable interfacing therewith as will be explained infra. An additional aperture 150 has been made in the first side 45 to facilitate insertion of a sensing component 155 having a signal source transmitter and detector receiver for sensing documents 30 in the system guideway 25 passing therethrough the system guideway 25 and outputting signals indicative thereof to an electronic circuit (not shown). The particular component 155 used in a combination light source and light detector of a type commonly known and used in the art.

Embedded in extensions 157 in the lower portion of the first side 45 of the system guideway 25, as shown in FIGS. 2 and 5, are the write head 70 and a read head 65. Both heads 65, 70 in their extensions 157 being disposed underneath their respective drive drum 40. Each of the heads 65, 70 are disposed through apertures 158 in the first side 45 to face towards and slightly into the channel 135. Protecting the heads 65, 70 from actually touching the documents 30 is a facing 160 of low permeability material such as stainless steel plate. It will be noted that the heads 65, 70 and facing 160 actually sit on the plate 130 through apertures 165 in the channel 135. Smoothing indentations 170, 175 have been formed on the trailing edges relative to the document flow 10 of the drive drum apertures 133, the head aperture 158, the head apertures 165 in the first side 45 relative to the document flow 10 for facilitating the flow of documents 30 in the channel 135 past the respective apertures. To further facilitate document 30 flow, the mouth 177 of the system guideway 25 where documents 30 enter has been formed to diverge thereby allowing the apparatus guideway 35 to snugly interface with the system guideway 25. An additional extension 182 in the lower portion of the first side 25 of the system guideway 25 has been disposed under the drive drums 40 and between their shafts 80 to house a preamplifier, of a type well known, (not shown) for the read head 65 for electronic interfacing with external electronic circuits (not shown). It will be noted that the plate 130 also extends out to support the preamplifier 182. The lip 145 of the channel 135 mentioned supra is apertured 190 and smoothly indented 195 in a manner symmetrical to the supra discussed first side wall 45. Further lateral support for the upper portion of the first side 45 is provided by a pair of buttresses 200, as shown in FIG. 3, resting on the head extensions 157.

A first set of screws 180, as shown in FIG. 3, one on either opposite end of the first side 45 secures the plate 130 to the base member 20 via an indentation 183 in the first side 45. A second set of screws 185, again on either opposite end of the first side 45 is operative to secure the system guideway 25 to the plate 130. The heads 65, 70 in the system guideway 25 are located relative to the base member 20 by a pair of dowels 191 that are frictionally fitted into the plate 130 at one end and traversely depend into the base member 20 where they are mechanically locked in by an aperture 192 therein thereby precluding time-consuming locating of heads 65, 70 when installing.

As indicated supra, the second side or guidewall 50 of the system guideway 25 is operative to pivotally swing out for easy access when tactilely manipulated, as shown in FIG. 3. The pivoting second side 50 is operative to interact with a pair of helical springs 205 under tension and disposed over center relative to a plane defined by the meshing of the first 45 and second sides 50. Specifically, the springs 205 act to regulate the normal force on the spring-loaded pressure rollers 55 mentioned supra. As will be seen infra, regulation of the rollers 55 normal force is important for spatially controlling the documents 30 relative to the heads 65, 70. Additionally, the action of the springs 205 allows single action tactile opening and closing of the second side 50. Particular use of the single action opening is the ease of opening and closing the second side 50 for access to the heads 65, 70 and for clearing out document 30 jams.

One end of each of the springs 205, as shown in FIG. 3, is secured to a first post 210 residing in a notch 215 in the base member 20 proximate to an end of the second side 50. The opposite end of each of the springs 205 is secured to a second post 220 residing in a support lip 225 formed in the outer side and slightly back from the edge of the second side 50 so as to run transversely and continuously close all along therein of its ends and top for extra reinforcement. Tabs 230 are formed in the support lip 225 at each end to extend slightly down below the lower portion of the second side 50 with notches 235 formed in the lower extremity to be open on the inner and bottom sides, but closed on the outer side of the tab 230. Formed on the top side 75 of the base member 20 opposite the above mentioned tabs 230 are a pair of projections 245 in which a notch 250 has been formed in each to carry a common rod 255, as shown in FIGS. 3 and 5. The rod 255 being composed of a material having low permeability such as aluminum for magnetic reasons as mentioned supra. The rod 255 resting in the notches 250 of the projections 245 is disposed to extend slightly out from either of the outer sides thereby enabling the second side 50 to rest on the rod 255 via notches 235 in the tabs 230 thus enabling it to pivot to and fro thereon. For additional support of the tabs 230, buttresses 240, as shown in FIG. 5, are disposed at each end of the second side 50 between the innner side of the tabs 230 so as to be above the notch 235 and then extended across to the outer lower portion of the second side 50. Formed in the center of the top portion of the second side 50 above the support lip 225 is a slight indentation 260 for facilitating tactile manipulation of the second side 50 when closing or opening.

Two pairs of apertures 265, 270 are formed in the second side 50, as shown in FIG. 4, to facilitate the spring-loaded pressure rollers 55 and the document-to-head pressure devices 60 respectively to traversely extend slightly into the channel 135, as shown in FIG. 5, in a manner analogus to the drive drums 40 mentioned supra. Also in the apertures 265, 270, trailing edge smoothing indentations 275, 280 are formed in each of the two pairs of apertures 265, 270, again analogously to those smoothing indentations 170, 175 mentioned supra. It will be also remembered, that it was indicated supra that the mouth 177 of the system guideway 25 diverges which means in the specific context of the second side 50 that the leading edge on that second side 50 is a smoothed indentation also for facilitating document 30 flow. A final aperture 285 on the second side 50 is disposed in the center thereof symmetrically opposite the aperture 50 for the sensing component 155 in the first side 45. The purpose of this aperture 285 being to allow light from the light source of the component 155 to flow unimpedably through when there is no document 30 interposed therebetween in the channel 135 thus minimizing the possibility of any random reflection back to the light detector of the component 155 in the absence of any document 30.

The spring-loaded pressure rollers 55 disposed on the second side 50 approximately opposite the drive drums 40, as mentioned supra, and as shown in FIG. 4, comprise a H-shaped flexure 290 for derivately applying a normal pressure to documents 30 of varying widths. The H-shaped flexure 290 specifically includes a pair of parallel leaf springs with a common fulcrum at the crossbar 295 of the H-shaped flexure 290 that is equidistant from its dynamic points 300 at either end of each of the H-legs 305. The H-shaped flexure 290 is composed of a material having low permeability such as aluminum. The H-shaped flexure 290 is secured at the cross-bar by screw 310 or other means to the outer side of the second side 50 at the center thereof. A locating projection 315 has been formed in the lower portion of the outer side of the second side 50 to abut the lower side of the H-shaped flexure 290 when secured. An aperture 320 has been formed in the crossbar 295 for reasons analogous to those explained for the aperture 285 in the second side 50.

On either of the opposite ends 300 of the H-shaped flexure 290 is disposed a shaft 325, as shown in FIG. 4, bridging the ends 300 of the pair of H-legs 305 on a side proximate to the second side 50. The shaft 325 is composed of metal having low permeability such as aluminum. The shaft 325 is fixably secured to the ends 300 by screws 330 or other means. The cross sectional area at the ends of the shaft 325 will thus be interposed to slightly flex the H-shaped flexure 290 while being supported by the second side 50. Each of the shafts 325 has axially disposed thereon a cylinder 335 for transferring the pressure from the flexure 290 to the document 30 without impeding the flow of documents 30. The cylinder 335 is normally freely rotatable about the common axis of shaft 325. The cylinder 335 is composed of a low permeability material such as aluminum. Coating the circumferential wall of the cylinder 335 is a rubber-like material 340 having a relatively high friction coefficient suitable for bufferably gripping a document 30 in the channel 135.

As alluded to supra, the spring-loaded pressure rollers 55 extend through the apertures 265 and slightly into the channel 135, as shown in FIG. 5, where the action of the rollers 55 is analogus to the rubber coated cylinders 335. The derivative spring-loading of the rollers 55 and thus the cylinders 335, as mentioned supra, is the combinational result of the action of the helical spring 205 and the H-shaped flexure 290. More specifically, the under tension helical spring 205, as indicated supra, regulates the normal force on the cylinders 335 while the H-shaped flexure 290, by moving in and out of the channel, adapts itself to document 30 thickness even as it provides good pressure registration as to the documents 30. Since document 30 thickness is compensated for by the H-shaped flexure 290 rather than by the cylinder 335 itself, cyclic deformation and therefore the wear on the rubber-like material 340 coating on the cylinder 335 is relatively minimal. As such, the rolling friction load on the cylinder 335 will not vary substantially through time thereby improving the maintenance reliability of the system 5.

The pair of document-to-head pressure devices 60, as shown in FIGS. 4 and 5, disposed proximate to the second side 50 of the system guideway 25, as mentioned supra, are each fixably secured to the base member 20. The mounting medium for each of the devices 60 is a L-shaped bracket 345, as shown in FIG. 3, composed of a non-magnetic or low permeability material such as aluminum. The horizontal side 350 of the bracket 345 is secured to the base member 20 by screws 355 or other means. A projection 360 in the base member 20 that traverses an aperture 365 in the horizontal side 350 serves to locate the device 60 thus automatically fixing the device's 60 preload relative to the heads 65, 70 as will be seen infra. The vertical side 370 of the bracket 345 faces the aperture 270 opening into the channel 135. A tabular extension 275 is disposed from the vertical side 390 in the direction of document flow 10 as received. On the side of the vertical side 370 facing the aperture 270 there is fixably disposed a planar slab 380 of magnetic material having high permeability such as ferrite slab. The slab 380 acts to serve as a magnetic shield for the heads 65, 70 by redirecting any stray magnetic fields from the motor 110 or any other extraneous sources through the slab 380 rather than through the heads 65, 70. Disposed on the slab 380, on the side facing the aperture 270 and on the portion nearest the document flow 10 as received, is a tip piece 385 of resilient material such as foam rubber having a relatively very low spring constant. On the tabular extension 375 of the vertical side 370 is disposed a cantilevered flexure 390. The cantilevered flexure 390 is secured at one end or the non-free end 395 to the tabular extension 371 by screws 400 or other means. The cantilevered flexure 390 is composed of a non-magnetic or low permability material such as aluminum. Additionally, the cantilevered flexure 390 that is swept back relative to document flow 10 has a relatively low spring constant. The other or free end 405 of the cantilevered flexure 395 is interposably slightly bent by the heads 65, 70 into the foam rubber piece 385. The foam rubber piece 385 acting to improve damping of the dynamic response of the cantilever flexure 390. By pressurably contacting the heads 65, 70 against the free ends of the cantilever flexure 390, minimum stress or bending moment is applied while applying maximum load thereto. Particularly, since the cantilever flexure 390 is stress free at heads 65, 70, contact wear thereon will be appreciably inhibited. Likewise, performance in constantly holding the document 30 in close proximity to the heads 65, 70 will not suffer since normal force by the cantilever flexure 390 is sufficiently large while allowing relatively low resistance to entering documents 30. An additional feature of the cantilever flexure 390 is its relatively easy deflection thereby providing accessible in-place cleaning of the heads 65, 70 when the second side 50 is open and non-operating.

While the above referenced embodiments of the invention have been described in considerable detail with respect to the apparatus, it will be appreciated that other modifications and variations therein may be made by those skilled in the art without departing from the true spirit and scope of the invention.

What is claimed is:

1. A document read system disposed on a base member and having a write and read MICR head for writing and reading characters on a document comprising:
   a. means defining a linear path through which the documents may be throughputted, and for operatively mounting therein the write and read MICR heads to face the documents in said linear path defining means;
   b. first wall means fixably disposed on the base member for establishing one side of the document flow in said linear path defining means;
   c. second wall means pivotally disposed on the base member for establishing the other side of the document flow in said linear path defining means and for providing spring-loaded release and return for easy tactile access to documents in said linear path defining means;
   d. means disposed on the base member for driving the documents to be throughputted in said linear path defining means at a relatively constant speed;
   e. means disposed on said linear path defining means for maintaining good registration on the documents relative to said linear path defining means for minimizing relatively vertical spatial translations of documents of varying widths; and
   f. means disposed on the base member for enabling the document in said linear path defining means as it is throughputted by said driving means to be in close proximity to the write and read MICR heads for positive communative contact therewith.

2. The document read system of claim 1 wherein said first wall means having apertures formed therein for allowing the write and read MICR heads housably mounted therein to faceably communicate with documents in said linear path defining means.

3. The document read system of claim 2 wherein said first wall means having apertures for the heads further having smoothed indentations on the trailing edge sides of the apertures relative to document flow for uninterrupted passage of the documents past the apertures for the heads.

4. The document read system of claim 1 wherein said first wall means having apertures formed therein for allowing said driving means to operatively extend therethrough for operative contact with the documents in said linear path defining means.

5. The document read system of claim 4 wherein said first wall means having apertures for said driving means further having smoothed indentations on the trailing edge sides of the apertures relative to document flow for uninterrupted passage of the documents past the apertures for said driving means.

6. The document read system of claim 1 wherein said first wall means having apertures for disposing a sensing means facing into said linear path defining means for detecting passage of documents in said linear path defining means.

7. The document read system of claim 6 wherein said sensing means comprises a light source and a light detector for optially sensing the presence of a document in said linear path defining means for accordingly enabling or de-enabling the heads in said first wall means.

8. The document read system of claim 1 wherein said first wall means having a diverging edge relative to document flow for smoothly interfacing documents entering said linear path defining means.

9. The document read system of claim 1 wherein said first wall means having an extension in its lower portion forming a bottom support for documents flowing in said linear path defining means and having a lip portion formed to extend relatively upward from the extremity of said bottom support for operative interfacing with said second wall means.

10. The document read system of claim 9 wherein said bottom support of said first wall means having an aperture formed therein opening into the aperture for the heads for facilitating access of the heads into said linear path defining means for communication with documents therein.

11. The document read system of claim 10 wherein said bottom support of said first wall means having an aperture formed therein further having a smoothed indentation formed in the trailing edge of the aperture relative to document flow in said linear path defining means for uninterrupted passage of the documents past the apertures in said bottom support.

12. The document read system of claim 1 wherein said first wall means having a rigid relatively nonmagnetic planar plate interposed between said first wall means and the base member for buffering relatively slight vertical anomalies in the base member that might otherwise disturb document flow in said linear path defining means.

13. The document read system of claim 12 wherein said planar plate of said first wall means having a pair of dowels frictionally disposed relatively vertical therethrough and depending into the base member for automatically locating the heads mountably housed in said first wall means relative to the base member.

14. The document read system of claim 1 wherein said second wall means having apertures formed therein for allowing said registration means to extend therethrough said second wall means to operatively contact documents in said linear path defining means.

15. The document read system of claim 14 wherein said second wall means having apertures for said registration means further having smoothed indentations on the trailing edge sides of the apertures relative to document flow for uninterrupted passage of the documents past the apertures for said registration means.

16. The document read system of claim 1 wherein said second wall means having a diverging edge relative to document flow for smoothly interfacing documents entering said linear path defining means.

17. The document read system of claim 1 wherein said second wall means having apertures formed therein for allowing said closely proximating means to operatively extend therethrough for operative contact with the documents in said linear path defining means.

18. The document read system of claim 17 wherein said second wall means having apertures for said closely proximating means further having smoothed indentations on the trailing edge sides of the apertures relative to document flow for uninterrupted passage of the documents past the apertures for said closely proximating means.

19. The document read system of claim 1 wherein said second wall means having a notched indentation in its top edge for tactile manipulation of said second wall means.

20. The document read system of claim 1 wherein said second wall means having an aperture formed therein within a relatively central area for transmission of light therethrough indicating no document in said linear path defining means.

21. The document read system of claim 1 wherein said second wall means having disposed on a side opposite that in contact with documents a support lip running continuously and transversely along close to the rim of the ends and top of said second wall means for reinforcement thereof.

22. The document read system of claim 21 wherein said second wall means further comprises:
a. a pair of tabs extending relatively down and out from the lower portion of said second wall means and having notches formed in the extremity thereof to be open on the inner and down facing sides;
b. a rigid rod of non-magnetic material having its ends operatively disposed in each of the notches of said pair of tabs; and
c. a pair of projections having notches formed in the top side thereof to be open on either side and on top for tranversely carrying said rod near its ends, and said rod carrying projections being fixably disposed on the top surface of the base member thereby allowing said second side wall means to freely pivot about the axis of said rod relative to the base member.

23. The document read system of claim 22 wherein said second wall means further comprises:
a. a first post fixably disposed on each end of said second wall means on said support lip;
b. a pair of helical springs each having one end secured to each of said first posts; and
c. a pair of second posts each being secured to the other end of each of said helical springs for putting said helical springs under tension, and the other end of each of said second posts being fixably secured in a notch formed in the ends of the base member for maintaining a steady over center normal pressure on said second wall means for positive positioning thereof.

24. The document read system of claim 1 wherein said driving means comprises:
a. a motor means disposed on the base member for powering the system;
b. first shaft means for transferring power from said motor means through and to the underside of the base member;
c. first gear means disposed on the end of said first shaft means underneath the base member for receivably converting power from a shaft mode to a gear mode;
d. timing belt means operatively coupled at one end on said first gear means for receivably converting power from a gear mode to a belt mode;
e. second gear means operatively coupled to the other end of said timing belt means for receivably converting power from a belt mode to a gear mode;
f. second shaft means operatively coupled at one end to said second gear means for receivably converting power from a gear mode to a shaft mode and for extending said second shaft means under power through the base member and to the top side thereof; and
g. drum means operative to receive power from the other end of said second shaft means for throughputting documents in said linear path defining means.

25. The document read system of claim 24 wherein said motor means is an AC synchronous motor capable of relative high speed stability.

26. The document read system of claim 25 wherein said motor means further comprises a shield of magnetic material disposed between said motor means and the heads in said linear path defining means for inductively guiding magnetism from said motor means away from the heads in said first wall means.

27. The document read system of claim 24 wherein said timing pulley means is a groove timing belt and being additionally capable of regulating said second gear means to eliminate speed differentials therebetween.

28. The document read system of claim 24 wherein said second gear means are a pair of spur-like gears of heavily weighted material having high inertia giving additional speed stability.

29. The document read system of claim 24 wherein said drum means are a pair of drums of non-magnetic material.

30. The document read system of claim 1 wherein said registration means disposed on said second side for operative contact with documents in said linear path defining means comprises:
   a. flexure means disposed on said second wall means for derivatively applying a normal pressure to documents of varying widths in said linear path defining means; and
   b. roller means disposed on opposite ends of said flexure means for transferring pressure from said flexure means without impeding the flow of documents in said linear path defining means.

31. The document read system of claim 30 wherein said flexure means is a H-shaped flexure of non-magnetic material being secured as its cross bar to said second wall means and having disposed, on each pair of leg ends of said H-shape flexure, said roller means which will be flexed by said H-shaped flexure when a relatively wide document is encountered in said linear path defining means thereby minimizing cyclic deformation and friction wear thereon.

32. The document read system of claim 31 wherein said H-shaped flexure having an aperture in its crossbar for allowing light to pass therethrough indicative of a no document condition in said linear path defining means.

33. The document read system of claim 30 wherein said roller means comprises:
   a. shaft means transversely disposed on the ends of said flexure means and contacting said second wall means for accordingly slightly flexing said flexure means;
   b. cylinder means of non-magnetic material disposed on said shaft means for axial rotation therearound; and
   c. coating means circumferentially covering said cylinder means for providing a relatively low friction coefficient operative buffer surface as between the document in said linear path defining means and said cylinder means.

34. The document read system of claim 33 wherein said coating means of said roller means is comprised of a low friction coefficient rubber-like material.

35. The document read system of claim 30 wherein said second wall means further includes a projection means extending therefrom a side opposite that in contact with documents and disposed adjacent to a side of said flexure means for locating said registration means relative to said second wall means.

36. The document read system of claim 1 wherein said closely proximating means comprises cantilevered flexure means secured at its non-free end to the base member and in operative contact with the documents in said linear path defining means as its free swept back end relative to the document flow where pressure is applied to said cantilevered flexure means by the head through the documents for minimal bending moment and maximum load at the swept back free end thereof.

37. The document read system of claim 36 wherein said cantilevered flexure means is a pair of cantilevered flexures of non-magnetic resilient material having a relatively low spring constant.

38. The document read system of claim 36 wherein said closely proximating means further comprises foam-rubber pad means interposed between said cantilevered flexure means and the base member where said cantilevered flexure means is slightly bent at its free end by the heads through the documents to slightly depress said foam-rubber pad means for allowing said foam-rubber pad means to dampen the dynamic response of said cantilevered flexure means.

39. The document read system of claim 38 wherein said foam-rubber pad means is a foam rubber material having a relatively very low spring constant.

40. The document read system of claim 38 wherein said closely proximating means further comprises an L-shaped bracket including a relatively horizontal leg fixably abutted to the base member and further including a relatively vertical leg having on a portion directly facing said second wall means said foam-rubber pad means securably disposed thereon, and on a extended portion oriented towards the incoming document flow but slightly diverging therefrom is securably disposed said cantilevered flexure means at its non-free end.

41. The document read system of claim 40 wherein said L-shaped bracket is composed of a non-magnetic material.

42. The document read system of claim 40 wherein the relatively horizontal leg of said L-shaped bracket having an aperture formed therein for allowing a projection formed in the top surface of the base member to fittably protrude therethrough for locating said closely proximating means relative to the heads in said linear path defining means.

* * * * *